United States Patent [19]

Macken

[11] 4,221,468

[45] Sep. 9, 1980

[54] MULTI-CAVITY LASER MIRROR

[76] Inventor: John A. Macken, 4039 Shadow Hill Dr., Santa Rosa, Calif. 95404

[21] Appl. No.: 15,220

[22] Filed: Feb. 26, 1979

Related U.S. Application Data

[63] Continuation of Ser. No. 803,279, Jun. 3, 1977, abandoned.

[51] Int. Cl.³ .............................................. H01S 3/081
[52] U.S. Cl. ............................ 350/292; 331/94.5 R; 350/299
[58] Field of Search .................... 331/94.5 C, 94.5 D; 350/292, 299

[56] References Cited

U.S. PATENT DOCUMENTS

| 3,811,983 | 5/1974 | Rowland | 350/292 |
| 3,972,598 | 8/1976 | Kunz | 350/299 |

*Primary Examiner*—William L. Sikes
*Attorney, Agent, or Firm*—Edward E. Roberts

[57] ABSTRACT

There is provided a laser mirror which produces an unusual type of laser output beam with certain desirable properties. For example, diffraction limited laser beams can be produced with large size components. The mirror is reflective, non-transmissive, and includes a plurality of spherical cavities therein.

8 Claims, 4 Drawing Figures

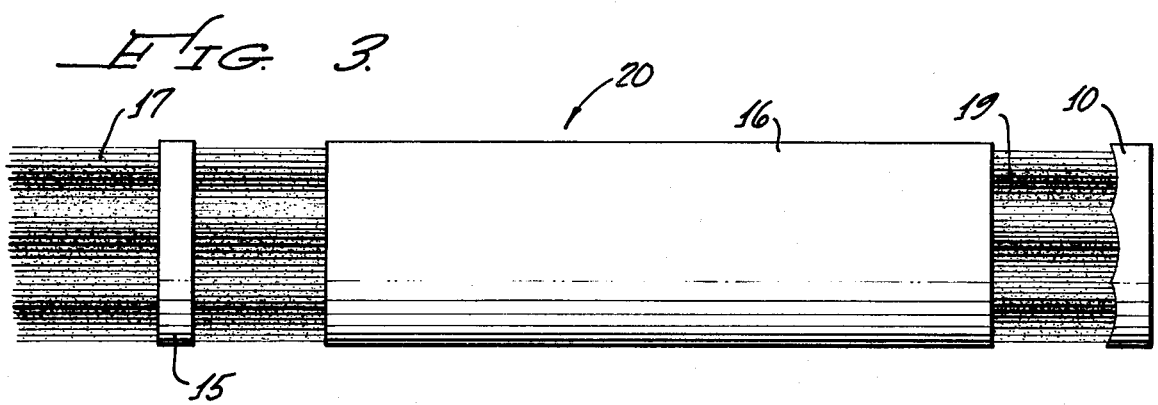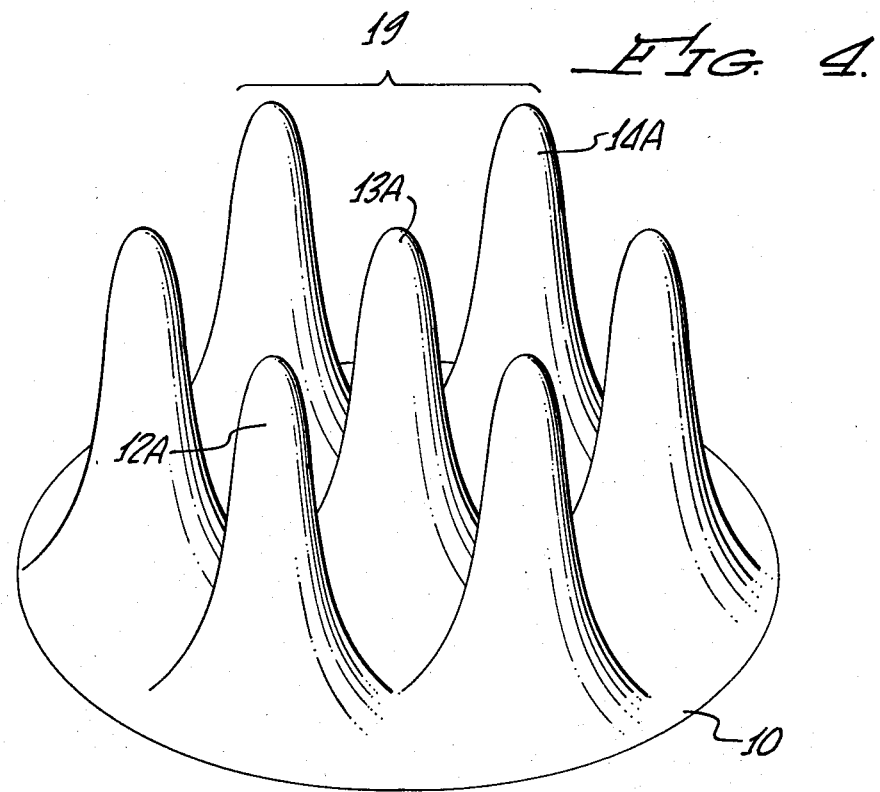

MULTI-CAVITY LASER MIRROR

This is a continuation of application Ser. No. 803,279 filed 6/3/77, and now abandoned.

BACKGROUND

1. Field of the Invention

This invention relates to lasers, in general and to improved reflective mirrors for use with lasers, in particular.

2. Prior Art

Lasers are devices which are known in the art as devices for generating coherent light usually in the form of a relatively narrow, parallel beam of monochromatic light. Lasers and laser beams can exhibit high power characteristics.

Lasers designed for high output power are usually used in applications which require that this power (beam) can be focused to a spot size which is so small that the dimensions of the spot are limited only by the well-known laws of optical diffraction. However, in designing a high power laser it is often desirable to use large diameter optical and mechanical components. Unfortunately in order to maintain a diffraction limited laser output beam to be able to be focused to a diffraction limited spot, the laser had to be oscillating in the $TEM_{00}$ mode (as is well known to those skilled in the art of laser). However, in order to obtain $TEM_{00}$ mode oscillation from a laser, some method of discriminating against higher order laser modes must be employed. The most common method used is to design the laser with a low Fresnel number cavity. The Fresnel number of a laser is given by the following formula:

$$N = a^2/\lambda d$$

Where:
  $N$ = Fresnel number
  $\lambda$ = Laser wavelength
  $d$ = Distance between the laser mirrors
  $a$ = Aperture radius.

Particularly "a" is the radius of the internal aperture which determines the diameter of the laser beam at which diffraction losses occur. Normally "a" would be the inside radius of the laser tube but with a multi-cavity mirror, the limiting aperture is the radius of the individual cavities as described hereinafter.

In lasers, such as $CO_2$ lasers, which are designed for high output powers it has been found experimentally that a Fresnel number of less than one usually results in $TEM_{00}$ mode oscillation while numbers greater than 3 usually result in higher order mode oscillation. For numbers between 1 and 3, the mode of oscillation depends on many factors including the curvature of the mirrors, the gain of the laser and the like. Inasmuch as the number is proportional to the radius squared, it can be seen that there is a limit to the maximum radius which is allowed for a given mirror separation and wavelength. However, frequently it is found that this maximum radius is smaller than the optimum radius for generating the highest laser powers.

One method of obtaining single mode output from lasers with large Fresnel numbers is to use a laser mirror design commonly referred to as an unstable resonator. However, this approach has several undesirable features which include for example, extremely critical mirror alignment, an annular output beam, and a loss in laser efficiency.

SUMMARY OF THE INVENTION

The instant invention relates to a new type of reflective laser mirror which permits large radius tubes to be used as resonators. The mirror is substantially totally reflective and non-transmissive. A plurality of cavities or indentations are provided in the surface of the mirror. Preferably, the cavities are of generally spherical configuration with relatively large radius or curvature. Also, the cavities lie in substantially the same plane. The multi-cavity mirror is constructed in such a way that the output of the multiple cavities are all at precisely the same wavelength and with a fixed phase relationship.

BRIEF DESCRIPTION OF THE DRAWINGS

FIG. 3 is a cross-sectional view of a typical laser configuration using the multi-cavity laser mirror of the instant invention.

FIG. 4 is a graphical representation of the intensity distribution of the output laser beam produced when the multi-cavity mirror shown in FIG. 1 is used as one of the laser reflectors.

DESCRIPTION OF PREFERRED EMBODIMENT

Figure 1:
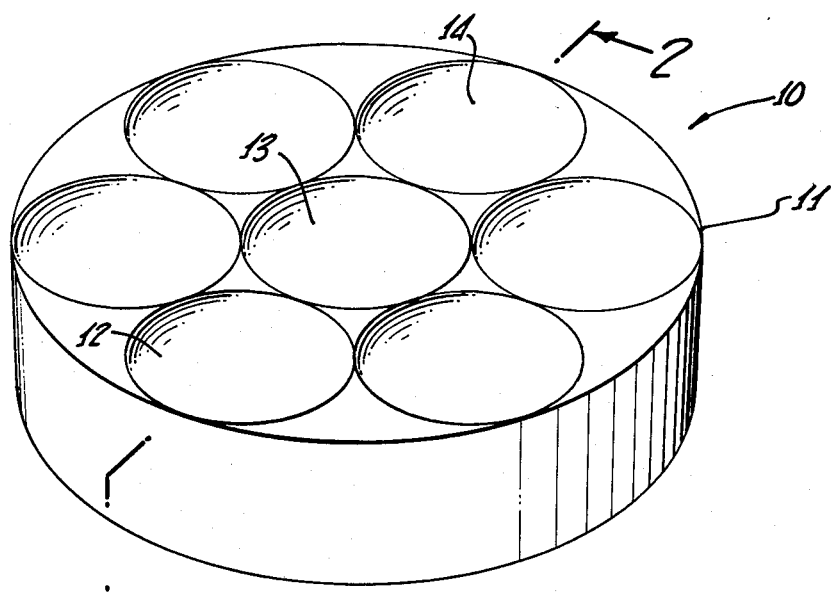
FIG. 1 is a perspective view of the laser mirror which forms the instant invention.

Referring now to FIG. 1, there is shown a perspective view of laser mirror 10. Laser mirror 10 comprises a substrate 11 of suitable material, size and configuration. A plurality of approximately spherical indentations 12, 13 and 14 are provided in the reflective surface of substrate 11. The design criteria for the indentations (or cavities) are discussed in detail infra. The substrate material may be naturally reflective or the indented surface may be coated with a suitable reflective material. The methods of producing mirror 10 (i.e., substrate or indented surface) do not form a portion of the invention per se.

Figure 2:
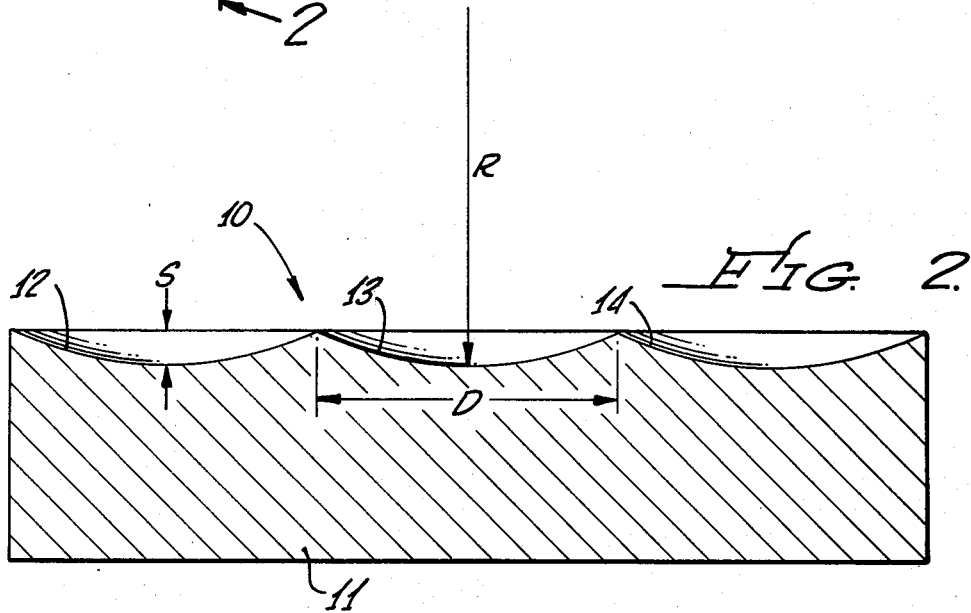
FIG. 2 is a cross-sectional side view of the laser mirror shown in FIG. 1.

FIG. 2 is a cross-sectional view of mirror 10. Indentations 12, 13 and 14 are shown as having relatively large radii. The indentations are included in the surface of substrate 11. The relative sizes of the substrate and the indentations are not intended to be limitative, merely illustrative. There are a number of methods for making the multi-cavity laser mirror. These methods include standard polishing techniques, mosaics of individual mirrors, ion erosion, and selective vapor deposition. It should be noted that from the criteria previously stated for satisfying the conditions for single phase oscillation, calculations show that the cavities are quite shallow.

FIG. 3 is a cross-sectional view of a typical laser configuration. The multi-cavity mirror 10 as shown in FIGS. 1 and 2 forms the rear reflector, the high reflectivity, non-transmitting laser mirror, for laser 20. Laser gain section 16 is disposed adjacent to mirror 10 and can be a solid, liquid or gaseous laser material. For example gain section 16, consists of optically pumped neodymium doped YAG or a mixture of carbon dioxide, nitrogen, and helium pumped by an electrical discharge such as is used for carbon dioxide lasers. These components are well known in the art. Reflector 15 is a substantially flat, semi-transparent (or partially reflective) mirror similar to those commonly used as laser output couplers. The ratio of transmission and reflection of this reflector should be optimized to produce the maximum laser output. Beam 17 represents the laser beam emitted through semi-transparent reflector 15.

Referring now to FIG. 4, there is shown a graphical representation of the intensity distribution of the output laser beam produced by laser 20. In particular, there are shown seven peaks of beam intensity. These peaks are based upon the mirror configuration shown in FIG. 1 wherein seven cavities are provided. Of course, the number of cavities and, thus, the number of intensity peaks can be varied in accordance with the laser system requirements.

In describing the operation of the laser, concurrent reference is made to FIGS. 1–4. In order to provide a high power laser with relatively large diameter components, mirror 10 is utilized in laser 20 as shown in FIG. 3. The beam 19 reflected by mirror 10 is characterized by a plurality of intensity peaks. The key to the usefulness of reflector mirror 10 lies in the fact that although there is a non-uniform intensity distribution across laser output beam 19, it is possible to obtain a single uniform phase across the laser beam. That is, when the laser beam is brought to focus, the majority of the laser light is focused to a point which corresponds to the diffraction limit of the overall beam diameter rather than the diffraction limit of the individual lobes. It is true that a laser beam with this type of non-uniform distribution would have a greater percentage of its light falling into diffraction lobes outside of the central spot than a uniform distribution laser beam of the same diameter. However, this loss is acceptable if the total laser power produced by the multi-cavity mirror is greater than would be obtainable with conventional mirror design.

To obtain this uniform phase in the output beam it is necessary to design multi-cavity mirror 10 so that beams 12A, 13A and the like produced by eacy cavity 12, 13 and so forth in the mirror, lases at the same wavelength and in phase with the beams produced by adjacent cavities in the multi-cavity mirror. Normally, each of cavities 12, 13 . . . acts as an independent mirror which produces a laser beam (individual peaks in FIG. 4) that is not coherent with the adjacent beams. Under this condition, the minimum spot size which the group of laser beams can be focused to, is the diffraction limit of a beam which emerges from a single cavity.

To allow all of the cavities to oscillate together in phase it is necessary to meet the conditions for locking two independent lases together. These conditions are: (1) That there must be some exchange of laser light between the independent lasers, and (2) The Fabry-Perot Resonance conditions for the independent lasers must be close enough together that locking the lasers is possible.

To meet the first of these conditions with the multi-cavity mirror 10 it is necessary to tailor the diameter and the radius of curvature of the sperical indentations 12, 13, 14 . . . so that there is the proper amount of laser light which spills over from one cavity to the adjacent cavities. To meet the second condition for locking the resonance together it is necessary that the spherical indentations 12, 13, 14 . . . all lie in substantially the same plane. The flat output coupling mirror 15 and the multi-cavity mirror 10 must then be aligned accurately enough that the resonance length of each of the individual cavities 12, 13, 14 . . . differ by only a small fraction of a wavelength of the laser light.

In a preferred embodiment of this invention, the radius R of curvature of the sperical cavities 12, 13, 14 . . . is between 1.5 and 5 times the distance between output coupling mirror 15 and the multi-cavity mirror 10. The diameter D of the spherical cavities is chosen so that the diffraction loss for the $TEM_{00}$ mode would be between 30 percent and 0.1 percent. It must be remembered that in the design of multi-cavity mirror 10, the diffraction loss from a single cavity is not necessarily a loss for the entire system. That is, this apparently lost radiation couples over into beams from adjacent cavities providing the necessary transfer of radiation to permit all the cavities to lock into a single phase. There have been a number of technical papers dealing with the diffraction loss of laser modes. Reference is made to "Diffraction Loss and Selection of Modes in Maser Resonators with Circular Mirrors" T. Li, Bell System Technical Journal, May 1965, p. 917.

In the Li paper, it is shown that for aperture radii which range between 1.5 and 5 times the mirror separation, the permissible Fresnel numbers are between 0.6 and 3 to obtain a diffraction loss between 30 percent and 0.1 percent.

By inserting the permissible Fresnel numbers into the equation previously given it can be seen that a change by a factor of 300 in diffraction loss is accomplished by a change in aperture radius of approximately a factor of two. Therefore, there is a relatively narrow range of permissible aperture radii for the individual cavities 12, 13, 14 . . . which make up multi-cavity mirror 10. The placement of the individual cavities should be as close as possible to each other although it is not necessary to use the close pack arrangement shown in FIG. 1. Other possible configurations would include a square pattern or a concentric circle pattern, neither of which patterns are shown.

The second consideration in designing multi-cavity laser mirror 10 is that all the cavities should have approximately the same resonance length with flat output coupler 15. For this condition to exist, the spherical cavities must all lie in substantially the same plane. That is, the spherical cavities must all have substantially the same depths relative to the upper surface of the multi-cavity mirror 10. When aligning the multi-cavity mirror 10 with the flat output coupler 15 there is a range of adjustment angles wherein the alignment is sufficient to permit the laser to oscillate. However, each of the cavities tend to function independently. As the alignment is improved, adjacent cavities in the multi-cavity mirror 10 begin to oscillate in phase until at, or very near to, perfect alignment, all of the cavities oscillate in phase.

The sagittal depths of cavities 12, 13, 14 . . . is typically less than one-half wavelength for the most common laser parameters. For example, in the case where the individual cavities form folded confocal resonators, i.e. the radius of curvature R equals twice the separation d between the laser mirrors 10 and 15, the sagittal depth of the cavities is:

$$S = N/4\lambda$$

Where:
S = Sagittal depth
N = Fresnel number
$\lambda$ = Laser wavelength

For the case where the loss of an individual cavity is 2 percent, The Fresnel number will be 1.3 and the sagittal depth would be $0.32\lambda$. Even for $CO_2$ lasers with a $10.6\mu$ wavelength this is a very shallow depth. Therefore multi-cavity mirrors 10 can be manufactured by starting with a flat mirror and building up the contours using vapor deposition techniques or by using ion erosion. Both of these techniques are well known to those skilled in the art.

While the example used in this patent application is for a laser mirror combination of one flat mirror 15 and one multi-cavity mirror 10 it should be realized that there are some obvious extensions of this design. For example, flat mirror 15 could be replaced with a long radius curved mirror to compensate for a negative lens effect which is sometimes present in laser materials with radial heat flow. Also, it may be found that a slight concave curvature is desirable to reduce edge diffraction losses. The embodiment described herein is intended to be illustrative only and is not intended to be limitative. The scope of the instant invention is limited only in accordance with claims appended hereto and equivalents.

Having thus described a preferred embodiment what is claimed is:

1. In combination:
    a radiation reflective element having a plurality of substantially spherical reflector cavities in a flat surface thereof, each of said cavities having substantially the same sagittal depth S relative to said surface;
    each of said cavities having substantially the same radius of curvature R and diameter D, said cavities lying in close arrangement with adjacent cavities separated substantially the same distance d one from the other whereby an exchange of radiation is provided between adjacent ones of said cavities;
    a flat partially reflective partially transparent coupling mirror separated a distance L from said reflective element; and
    an optical gain section including active media and pump source interposed between said coupling mirror and said reflective element for producing a radiation beam of wavelength $\lambda$ which is reflected by said reflective element and passed through said coupling mirror.

2. The combination recited in claim 1 wherein;
    said coupling mirror and said reflective element are aligned with the flat surfaces thereof substantially perpendicular to a common axis of symmetry such that the resonance length of each of said cavities differ by only a fraction of wavelength $\lambda$ whereby reflected radiations from said cavities are locked together to oscillate in fixed phase relationship.

3. The combination recited in claim 2 wherein,
    the radius of curvature R is between 1.5 and 5 times the distance L between said reflective element and said coupling mirror.

4. The combination recited in claim 3 wherein,
    said separation distance d is substantially one-half the radius of curvature R, and said cavities have a sagittal depth equal to the Fresnel number thereof multiplied by said wavelength $\lambda$ and divided by the numeral four (4).

5. In combination:
    a first and second laser mirror separated a distance L one from the other and aligned substantially perpendicular to a common axis of symmetry;
    means for amplifying radiation of wavelength $\lambda$ positioned between said first and second mirrors;
    said first mirror being partly transparent to said radiation and said second mirror having thereon a plurality of closely spaced sperical cavities for reflecting said radiation, each cavity having substantially the same sagittal depth and lying substantially tangent to a common plane and having substantially the same radius of curvature R and separated substantially the same distance d from its nearest neighbor whereby radiation reflected by said cavities is locked together and oscillates in fixed phase relationship.

6. The combination recited in claim 5 wherein,
    said first mirror is a long radius curved concave mirror to thereby compensate for negative lens effect and reduce edge diffraction losses.

7. The combination recited in claim 5 wherein, said radius of curvature R satisfies the equation $L<R<40L$ thereby restricting diffraction losses below 30 percent; and
    the separation distance d of said cavities satisfies the equation $(\lambda L)^{0.5}<d<8(\lambda L)^{0.5}$.

8. The combination recited in claim 7 wherein;
    said sagittal depth of each of said cavities is the same to within $\lambda/5$,
    each of said cavities lie tangent to a common plane to within $\lambda/5$, and
    the surfaces of said first and second laser mirror are flat to within $\lambda/5$.

* * * * *